United States Patent

Asari et al.

[11] 4,439,099
[45] Mar. 27, 1984

[54] APPARATUS FOR STACKING ELONGATED MATERIALS

[75] Inventors: Akira Asari, Osaka; Tatsuhiko Noyori, Kobe; Takahisa Tabuchi, Kobe; Munenori Soejima, Kobe; Tetsuya Miyauchi, Kobe, all of Japan

[73] Assignee: Kabushiki Kaisha Kobe Seiko Sho, Kobe, Japan

[21] Appl. No.: 269,758

[22] Filed: Jun. 2, 1981

[30] Foreign Application Priority Data

Jun. 4, 1980 [JP] Japan .................. 55-76196

[51] Int. Cl.³ ........................................ B65G 57/10
[52] U.S. Cl. .................................... 414/45; 414/57; 414/100; 53/148; 53/536
[58] Field of Search .............. 53/148, 536; 414/43, 414/45, 57, 86, 100, 110

[56] References Cited

U.S. PATENT DOCUMENTS

| 2,698,100 | 12/1954 | Fried | 414/110 X |
| 3,548,895 | 12/1970 | Gentry, Jr. | 414/45 X |
| 3,664,087 | 5/1972 | Choate et al. | 53/536 |
| 3,683,582 | 8/1972 | Sequin | 53/536 X |
| 4,002,249 | 1/1977 | Shinomiya et al. | 414/110 X |

FOREIGN PATENT DOCUMENTS

| 1314057 | 4/1973 | United Kingdom | 53/536 |
| 398730 | 2/1974 | U.S.S.R. | 414/745 |

OTHER PUBLICATIONS

"Stahl und Eisen 99", (1979), No. 13, pp. 688–692.

Primary Examiner—Leslie J. Paperner
Assistant Examiner—Ken Muncy
Attorney, Agent, or Firm—Oblon, Fisher, Spivak, McClelland & Maier

[57] ABSTRACT

An apparatus for sequentially feeding and stacking elongated or lengthy material in a receptacle channel of a load-carrying bed or stand. The apparatus is constructed to transfer the elongated material to the receptacle channel by a reduced number of support beams which are movable vertically to permit adjustment of the distance the elongated material is to be dropped onto the receptacle channel from the support beams.

5 Claims, 31 Drawing Figures

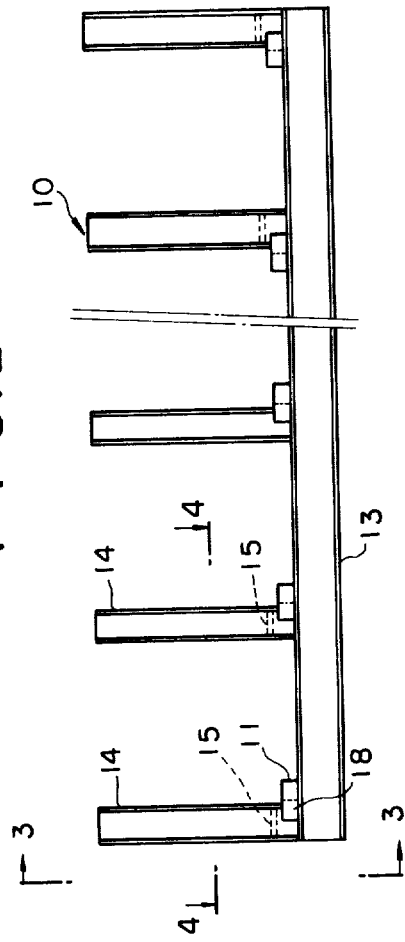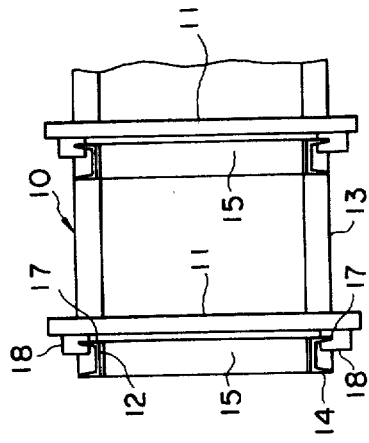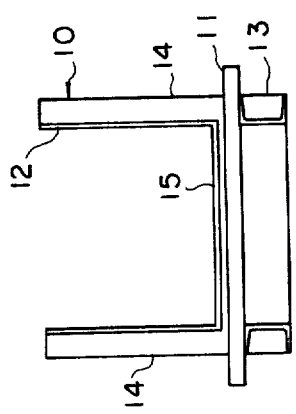

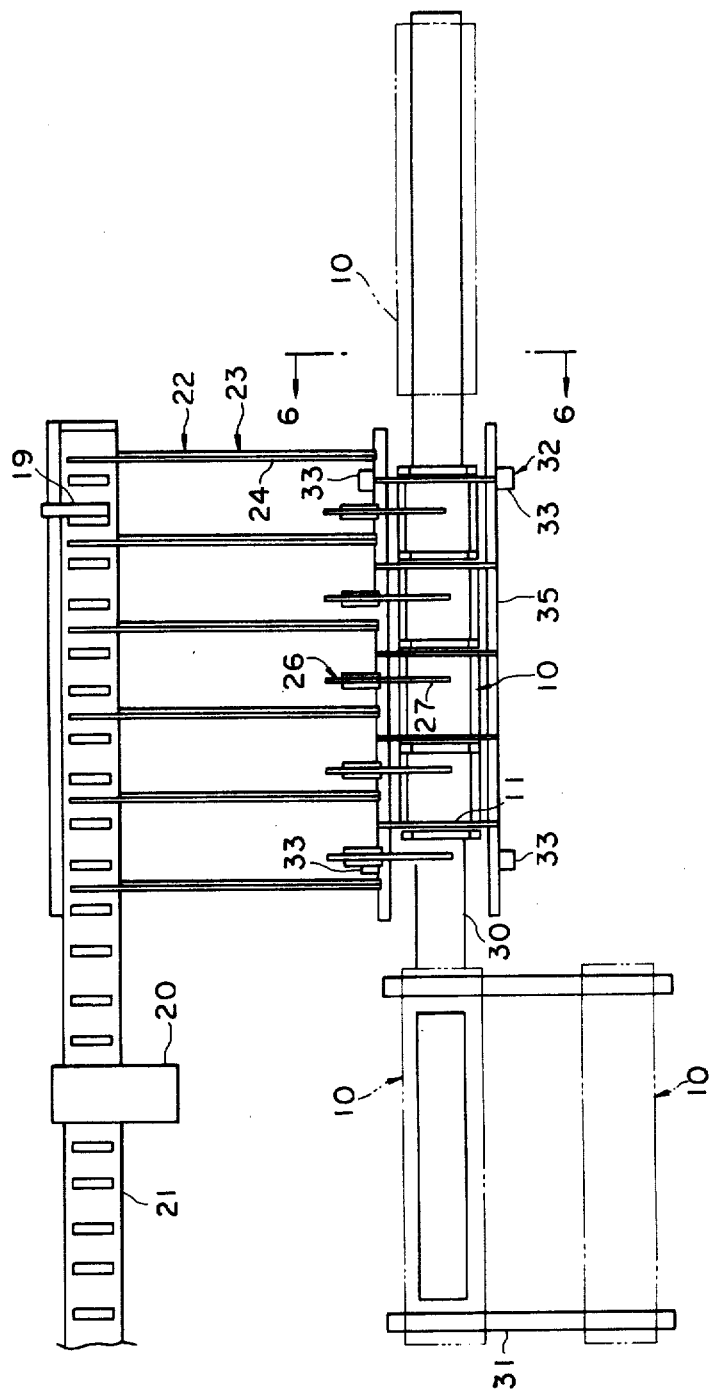

F I G. 28
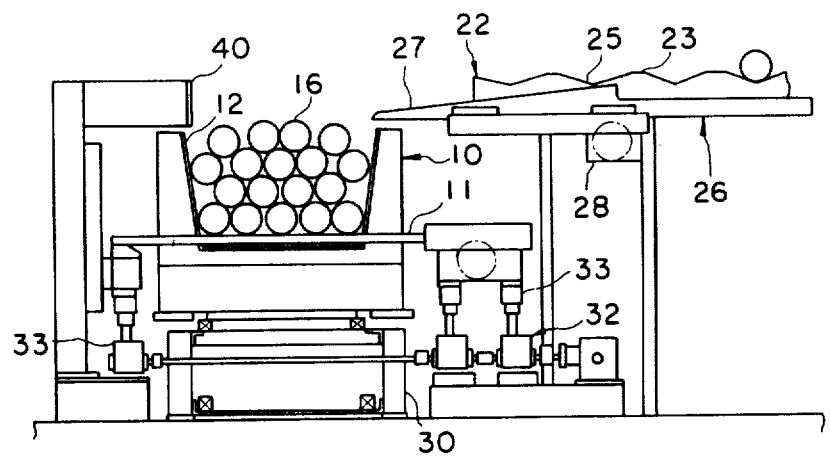
F I G. 29
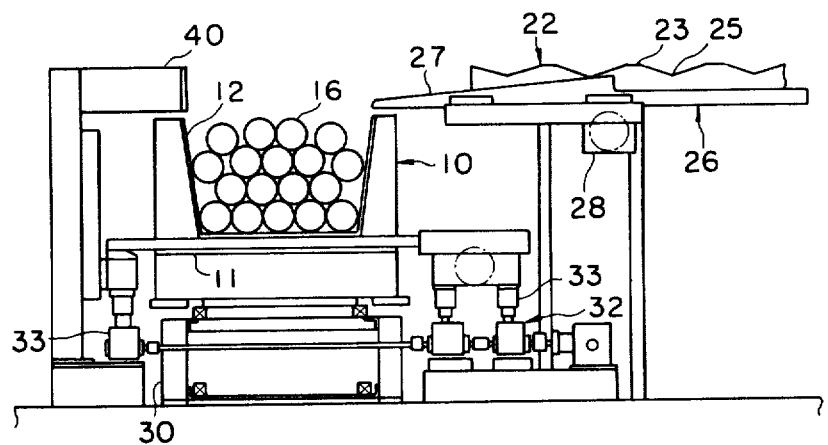

APPARATUS FOR STACKING ELONGATED MATERIALS

BACKGROUND OF THE INVENTION

1. Field of the Invention

This invention relates generally to load handling apparatus, and more particularly to an apparatus for stacking elongated or lengthy material like pipes on a stacking bed or stand.

2. Description of the Prior Art

Known in the art is a loading apparatus which is arranged as shown in FIG. 1 for automatically stacking elongated material like extruded products of aluminum, copper and the like while preventing damage thereto resulting from collisions of the individual elongated products. More specifically, the apparatus includes a stacking bed 2 which is movably supported on a conveyor 3 and provided with a horizontal, sectionally U-shaped channel 1. On the other hand, a collector 5 is located on one side of the bed to gather a group of elongated strips or materials 4 of a predetermined number corresponding to the width of receptacle channel 1, collector 5 cooperating with an overhead feeder 6 which transfers each group of elongated strips 4 from collector 5 to stacking bed 2. In this instance, elongated strips 4 which are transferred by feeder 6 are supported on transverse support beams 7, which are also stacked in receptacle channel 1 alternately with the layers of the elongated strips since it is difficult to remove the support beams under the weight of elongated strips 4.

The above-mentioned conventional apparatus is disadvantageously complicated due to the necessity of collector 5 which gathers a number of elongated strips 4 prior to the transfer to stacking bed 2 and a support beam feeder 9 which is associated with collector 5. In addition, support beams 7 which are stacked alternately with the layer of elongated strips 4 lower the capacity of the stacking bed 2 by forming substantial dead spaces. The conventional loading apparatus has another inherent problem in that it requires fabrication, supply and recovery of a great number of support beams 7 and the troublesome operations connected therewith.

SUMMARY OF THE INVENTION

It is therefore an object of the present invention to overcome the above-mentioned drawbacks or problems of the conventional apparatus.

A more particular object of the present invention is to provide an apparatus which is capable of stacking elongated materials using a reduced number of support beams while holding the damage due to collision of the stacking materials to a minimum.

According to one aspect of the present invention, the above-mentioned objects are attained by an apparatus which includes a load-carrying bed having a substantially horizontal, sectionally U-shaped receptacle channel for stacking elongated material therein; a feeder adapted to sequentially feed elongated material to the receptacle channel with the axis of the elongated material being substantially parallel therewith; and a plurality of support beams extending horizontally across the receptacle channel to support elongated material being fed to the receptacle channel at longitudinally spaced positions on opposite sides of the center of gravity of the material, the support beams being movable up and down to permit adjustment of the distance of the elongated material to be dropped onto the receptacle channel.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein:

FIG. 2 is a side elevation of a load-carrying bed in a stacking apparatus embodying the present invention;

FIG. 3 is an end view of the bed taken in the direction of arrow 3—3 of FIG. 2;

FIG. 4 is a fragmentary top view of the bed taken on line 4—4 of FIG. 2;

FIG. 5 is a schematic plan view showing the overall layout of the apparatus of the invention;

FIGS. 22 through 31 are schematic views showing consecutive phases of stacking operation of the second embodiment.

DETAILED DESCRIPTION OF THE PREFERRED EMBODIMENTS

Figure 1:
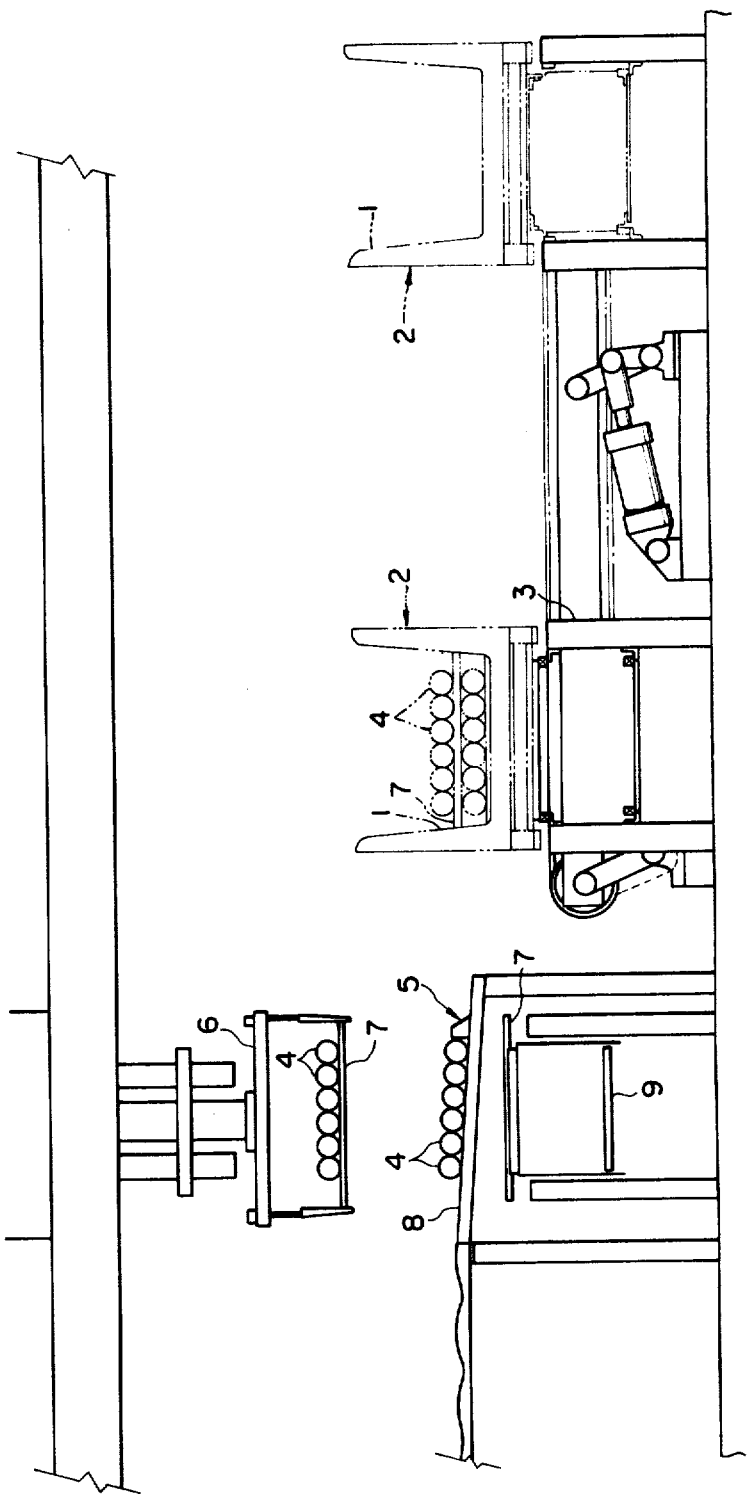
FIG. 1 is an overall view of a conventional apparatus.

Reference is first had to FIGS. 2 through 17 which illustrate a first preferred embodiment of the invention and particularly to FIGS. 2 to 4 which illustrate primarily a load-stacking bed or stand 10 and transverse support beams 11. The stacking bed 10 has a substantially horizontal, sectionally U-shaped receptacle channel 12 defined by a number of bottom frames 13 which are rectangular in plan view and formed of channel material and a number of upright frames 14 which are erected on the bottom frames 13 at uniform intervals along the length thereof, the bottom frame forming a bottom surface of the receptacle channel 12. The upright frames 14 which are also constituted by a channel material open on outer side form pairs in the transverse direction of the bottom frames 13, with a cross plate 15 bridged between lower ends of each pair of upright frames 14.

The support beams 11 are located horizontally across the receptacle channel 12 and are so positioned as to support elongated strips on opposite sides of the center of gravity of the respective elongated strips. Each support beam 11 is provided with locking members 18 at opposite ends thereof, which are engageable with flanges 17 of the paired upright frames 14. Locking members 18 are slidable along upright frames 14 but completely block movements in horizontal directions of support beam 11. The upper surface of support beam 11 which is positioned at the lower ends of upright frames 14 is located at a level lower than the top surface of cross plates 15. Cross plates 15, support beams 11 and locking members 18 may be formed from wood, a synthetic resin or a metal but it is preferred to detachably connect the support beam 11 and locking members 18 by a suitable clamp mechanism.

Figure 6:
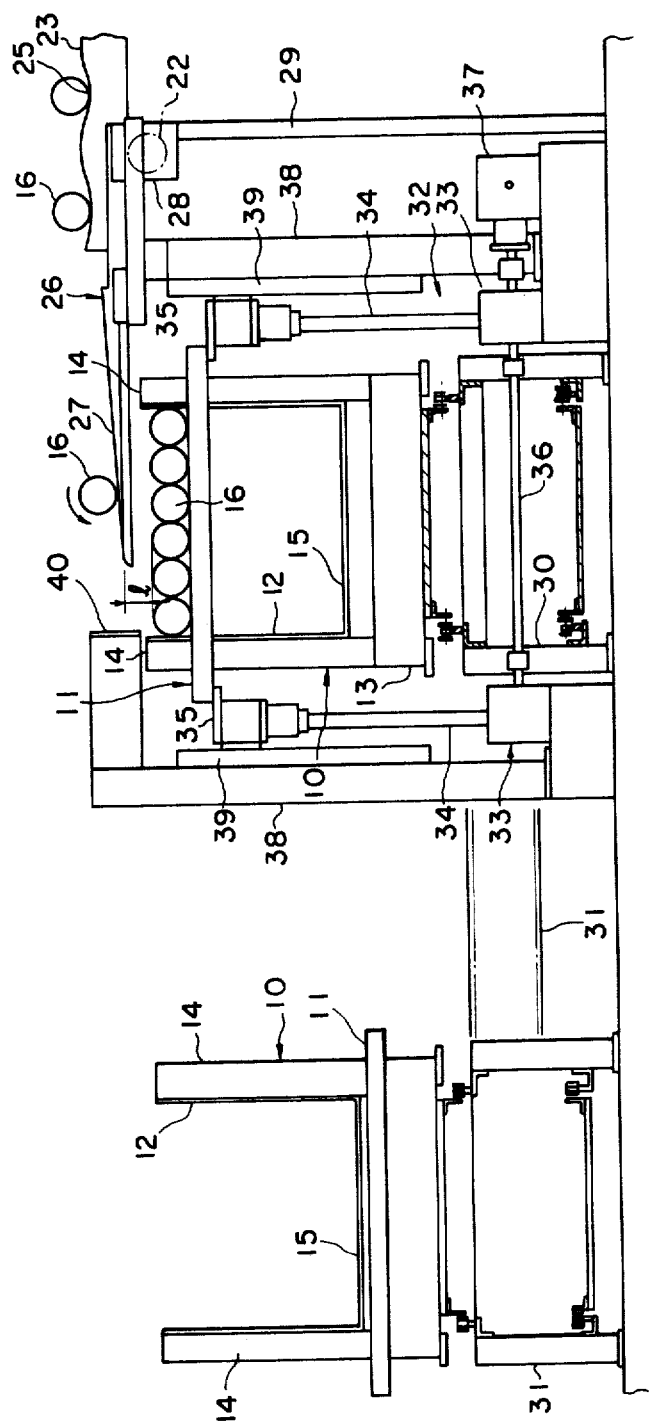
FIG. 6 is a view taken on line 6—6 of FIG. 5.

Referring to FIGS. 5 and 6 which illustrates the general construction of the first preferred embodiment, elongated strips 16 of round cross-section are delivered by a conveyor 21 which is provided with a stopper 19 and a cutter 20 for cutting into a predetermined length each elongated material the leading end of which abuts against stopper 19. Located perpendicular to and contiguous with the conveyor 21 is a transfer mechanism 22 which includes a number of fixed bars 23 located at uniform intervals and at right angles with the length of conveyor 21 and a plurality of movable bars 24 located along respective fixed bars 23, fixed and movable bars 23 and 24 being formed with transverse receptacle grooves 25 at uniform intervals along the lengths thereof.

Now, as seen from transfer mechanism 22, the direction toward conveyor 21 is herein referred to as "rearward" and the opposite direction is referred to as "forward" for the convenience of explanation. Elongated material on strips 16 in receptacle grooves 25 of opposing fixed bars 23 are successively and intermittently transferred forward by a transfer cycle including square motion of the movable bars 24, namely, an upward movement, a forward movement by one pitch of the receptacle grooves, a downward movement and a rearward movement by one pitch of the receptacle grooves. Simultaneously, elongated strips 16 on the conveyor 21 are transferred into the receptacle grooves 25 on the fixed bars 23.

A feeder 26 is located at the fore end of transfer mechanism 22 for sequentially feeding elongated strips 16 on transfer mechanism 22 to receptacle channel 12 with the axes of strips 16 being in parallel relation with channel 12. Feeder 26 includes a number of inclined beams 27 each with a sloped surface, a rack gear mechanism 28 for moving inclined beams 27 back and forth, and a fixed frame 29 for supporting rack gear mechanism 28. Included beams 27 are located between the fixed bars 23 and above a conveyor 30 for the bed 10 which is positioned within the range of the back-and-forth movements of the fore ends of inclined beams 27. Cradle conveyor 30 is a chain conveyor with a side conveyor 31 for delivering empty bed 10 to the loading end of conveyor 30.

The opposite ends of support beam 11 which are projected from opposite sides of bed 10 are supported on a lift mechanism 32 which is telescopically extensible to adjust the drop distance (l) of elongated material 16 which is successively dropped onto the stack of the load on support beams 11 from the fore ends of inclined beams 27 of feeder 26. Lift mechanism 32 includes pairs of screw type jacks 33 located on opposite sides of bed 10, upright screw portions 34 of jacks 33 being vertically movable and provided with support plates 35 at the respective top ends for supporting the end portions of support beams 11. Upward and downward movements of screw portions 34 of paired jacks 33 are synchronized by an interlocking shaft 36 and driven from a common motor 37. The top end portions of screw members 34 are slidably engaged with guide portions 39 on fixed side frames 38 to restrict their sideward deflections. A stopper 40 for the elongated material 16 is provided on one of fixed frames 38 opposingly to the front ends of inclined beams 27. Support beams 11 are disengageable from lift mechanism 32 upon reaching the bottom surface of receptacle channel 12.

It is to be noted that the conveyor 21, transfer mechanism 22, feeder 26, bed conveyor 30 and side conveyor 31 are not limited to the particular forms shown, and may be a chain conveyor, a belt conveyor or a roller conveyor whichever may be desired. Especially, bed conveyor 30 may be omitted by using wheeled carriages in place of beds 10. If desired, drives by power cylinders may be used for jacks 33 of lift mechanism 32 and inclined beams 27. Further, the top surfaces of support beams 11 in the lowermost positions may be at a level higher than the top surfaces of cross plates 15 as long as support beams 11 can take over the function of the cross plates 15 on the bottom surface of the cradle 10. In addition, elongated material 16 may be of square or other cross-sections.

Figure 7:
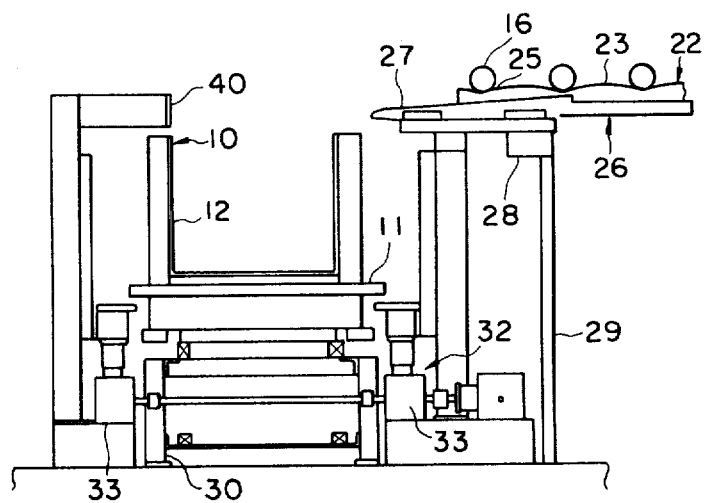
FIGS. 7 through 17 are schematic views showing consecutive phases of stacking operation.
Figure 8:
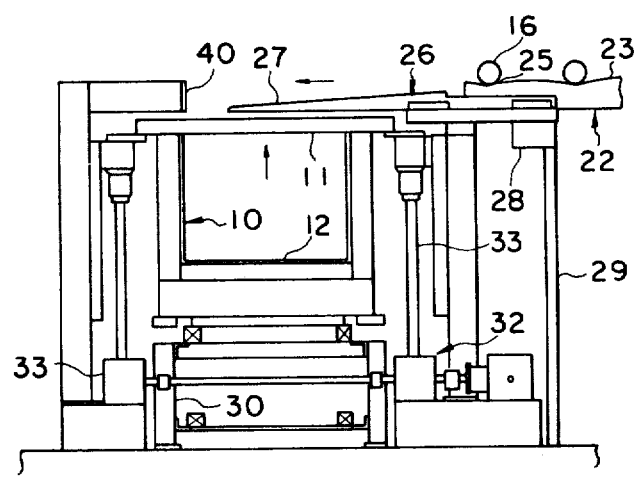

Reference is now had to FIGS. 7 through 16 which show sequential phases of the operation of loading elongated material 16 on bed 10 by the above-described load handling apparatus. In the first place, inclined beams 27 are retracted as shown in FIG. 7, and an empty bed 10 is stopped at a loading position in front of feeder 26. On the other hand, the support beams 11 are located in the lowermost positions on the bottom surface of receptacle channel 12, with opposite ends of support beams 11 being spaced away from lift mechanism 32. In the next phase shown in FIG. 8, screw members 34 of lift mechanism 32 extend out upwardly, lifting support beams 11 to a level close to top end of the bed 10, and inclined beams 27 are moved forward into protruded positions.

Figure 9:
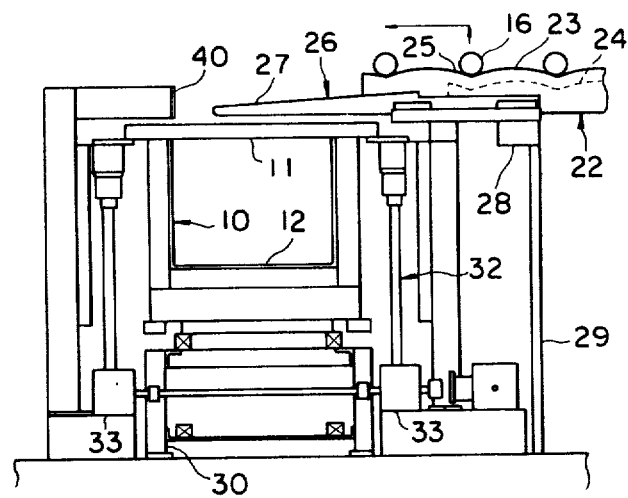
Figure 10:
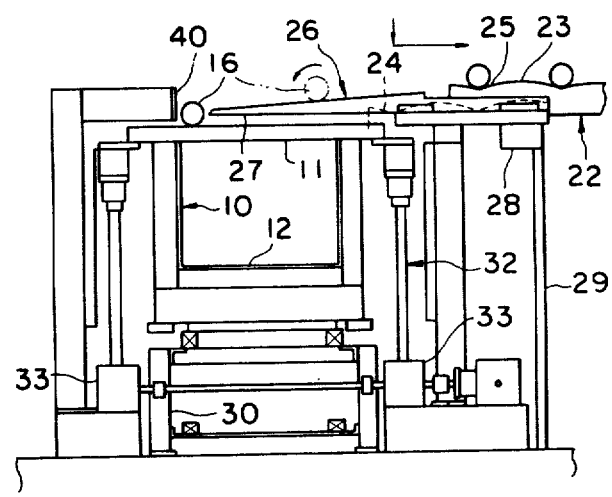

In the phases shown in FIGS. 9 and 10, the elongated material 16 is rolled down along inclined beams 27 by the square motions of movable bars 24 and dropped onto support beams 11 between stopper 40 and the fore ends of inclined beams 27.

Figure 11:
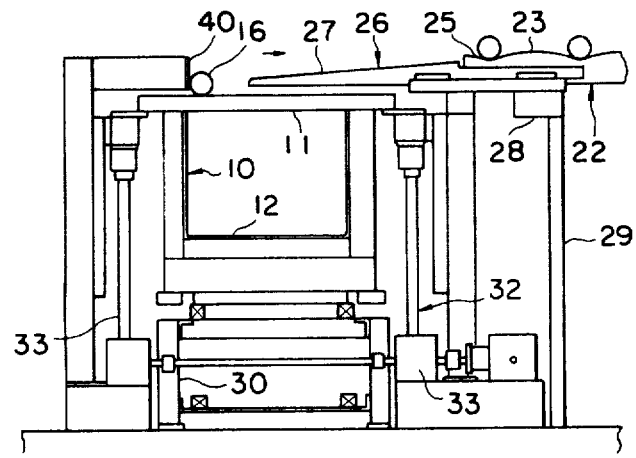
Figure 12:
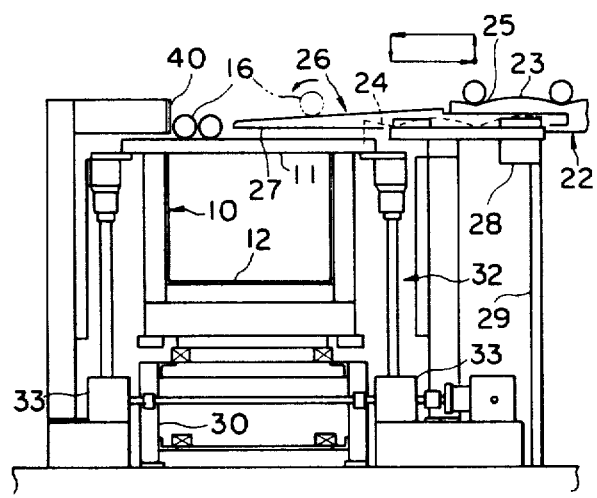
Figure 13:
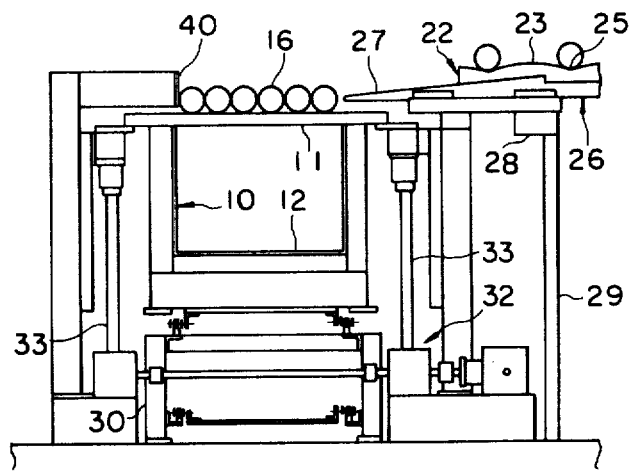
Figure 14:
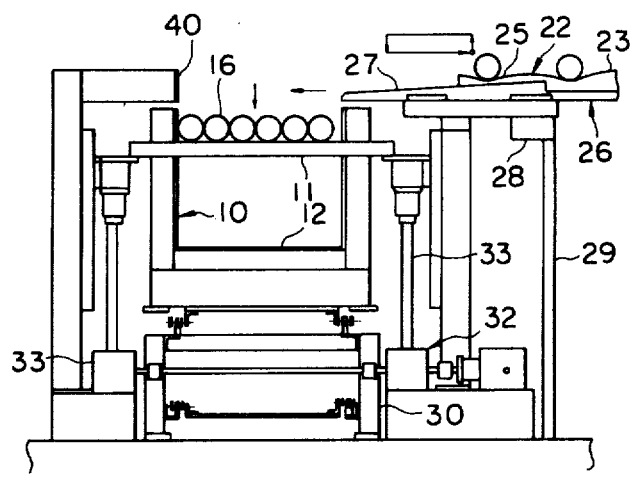

Then, inclined beams 27 are retracted a distance which corresponds substantially to the diameter of elongated material 16, as shown in FIG. 11, and succeeding elongated material 16 is placed next to the former by the same square motions of movable bars 24 as shown in FIG. 12. In this manner, the elongated material 16 is sequentially placed on the support beams 11. As soon as elongated material 16 is placed on support beams 11 in a number corresponding to the width of receptacle channel 12 as shown in FIG. 13, lift mechanism 32 is operated to lower support beams 11 in a level state by a distance corresponding to the diameter of elongated material 16 as shown in FIG. 14. The cycle of operation illustrated in FIGS. 7 through 14 is repeated, maintaining a minimum dropping distance (l) to reduce the damage due to collision individual elongated material 16 to as small a valve as possible during the loading operation.

Figure 15:
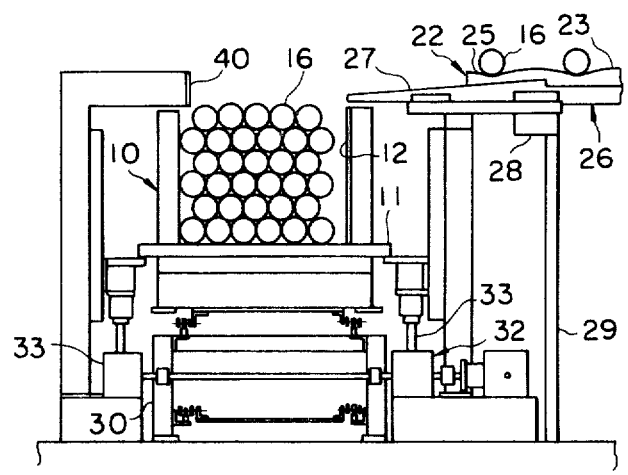
Figure 16:
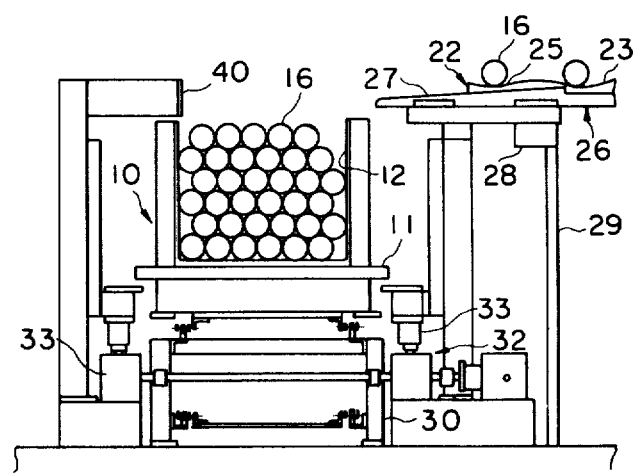
Figure 17:
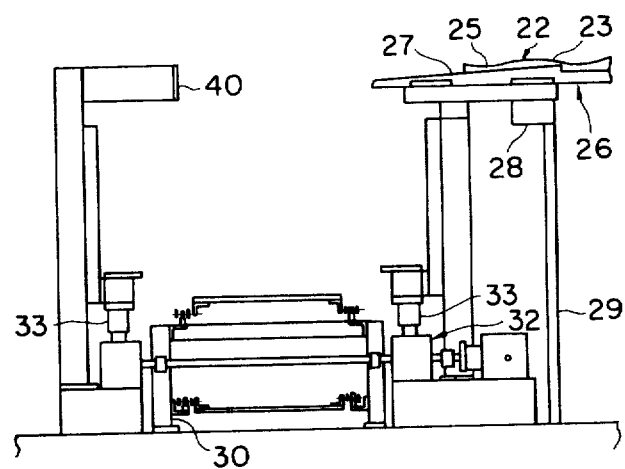

Once the receptacle channel 12 is filled with elongated material 16 until support beams 11 abut against the bottom surface of channel 12, the lift mechanism 32 is disengaged from support beams 11 as shown in FIGS. 15 and 16, and the fully loaded bed 10 is advanced to a predetermined position by cradle conveyor 30. Bed conveyor 30 in front of feeder 26 is thus vacated to receive a succeeding empty bed 10 as shown in FIG. 17.

Referring now to FIGS. 18 through 31, there is illustrated a second preferred embodiment of the present invention, in which, as previously indicated, the component parts common to the first preferred embodiment are designated by similar reference numerals and their description is omitted or simplified to avoid repetitions.

Figure 18:
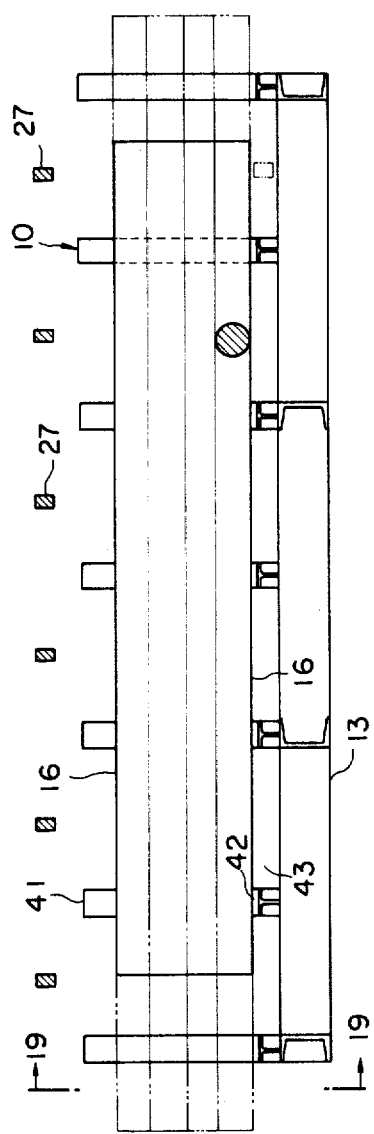
FIG. 18 is a side elevation of a load-carrying bed in a second embodiment of the present invention.
Figure 19:
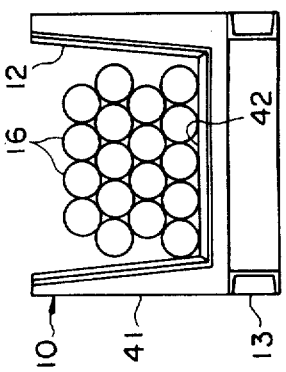
FIG. 19 is a view taken on line 19—19 of FIG. 18.

FIGS. 18 and 19 particularly illustrate a load-carrying bed 10 with a receptacle channel 12 formed by a number of open-topped U-shaped frames 41 which are securely mounted at uniform intervals along the length of a bottom frame 13 of bed 10. As shown in these figures, when elongated material 16 is loaded in the receptacle channel, spaces 43 are formed under loaded elongated material 16 and between adjacent bottom frames 13 to permit free extraction or insertion of support beams 11. In this situation, the top surfaces of bottom frames 42 are preferably formed of or covered with a soft material like wood, a synthetic resin or the like although metal surfaces are also acceptable.

Figure 20:
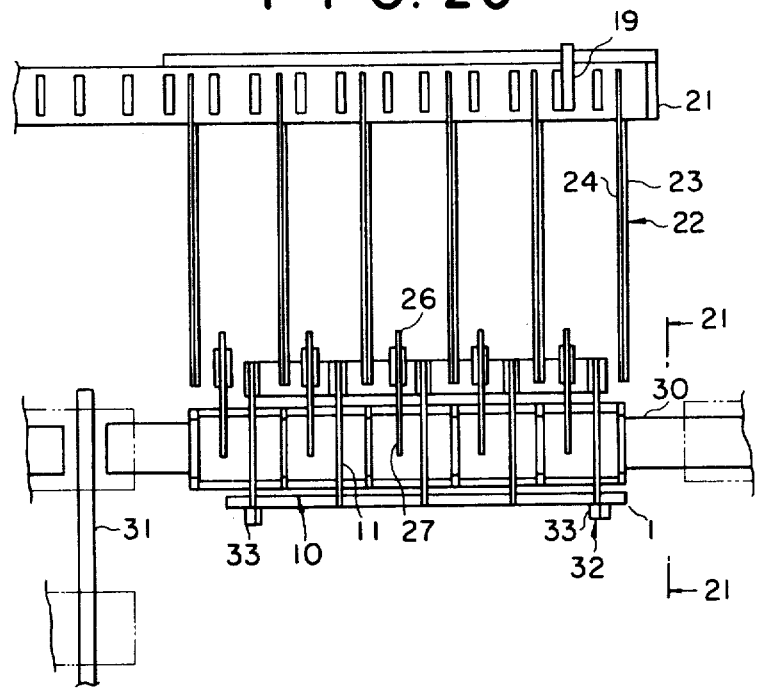
FIG. 20 is a fragmentary plan view of the second embodiment.
Figure 21:
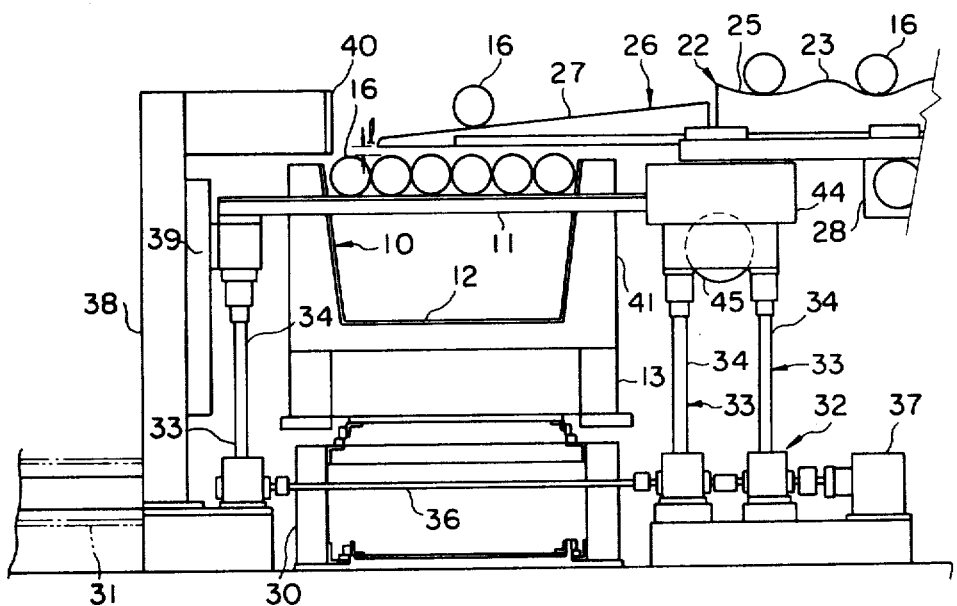
FIG. 21 is a view taken on line 21—21 of FIG. 20.

FIGS. 20 and 21 show the general arrangement of the second embodiment, in which the layout and construction of material conveyor 21, transfer mechanism 22, feeder 26, cradle conveyor 30 and side conveyor 31 are same as in the first embodiment.

Lift mechanism 32 is arranged substantially in the same manner as in the first embodiment except that double-shaft type screw jacks with two screw members 34 are provided on the rear side of bed 10, the screw members 34 supporting thereon a gear casing 44 accommodating a rack pinion 45 in engagement with rack gears formed on support beams 11 which are extended into casing 44 movably back and forth under drive of the rack pinion 45. The fore ends of support beams 11 are loosely supported on the top surfaces of screw jacks 33 on the front side of bed 10. The screw members of respective jacks 33 are moved up and down in synchronism with each other by an interlocking shaft 36. If desired, the support beams 11 may be moved back and forth by a power cylinder.

Figure 22:
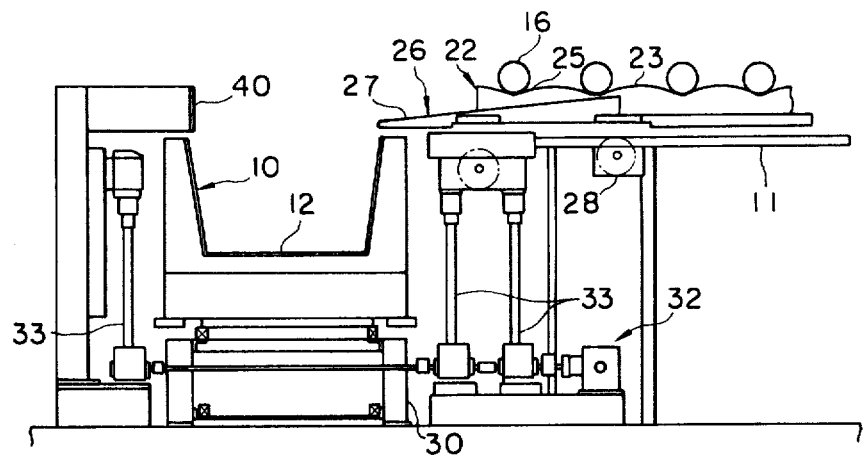
Figure 23:
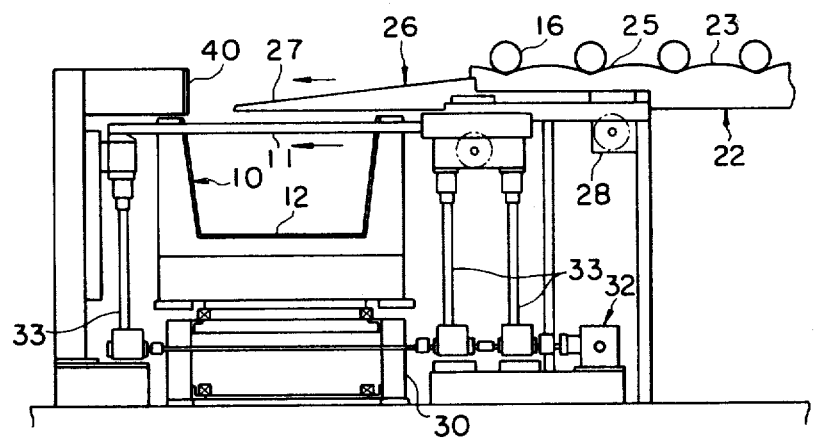

Reference is now made to FIGS. 22 through 31 which illustrate sequential phases of the operation of loading elongated material on bed 10 in accordance with the second embodiment. As shown in FIG. 22, inclined beams 27 and support beams 11 are initially retracted. In the next phase shown in FIGS. 23, inclined beams 27 as well as support beams 11 are extended out into respective protruded positions, supporting the fore free ends of support beams 11 on top surfaces of screw members 34 of opposing jacks 33.

Figure 24:
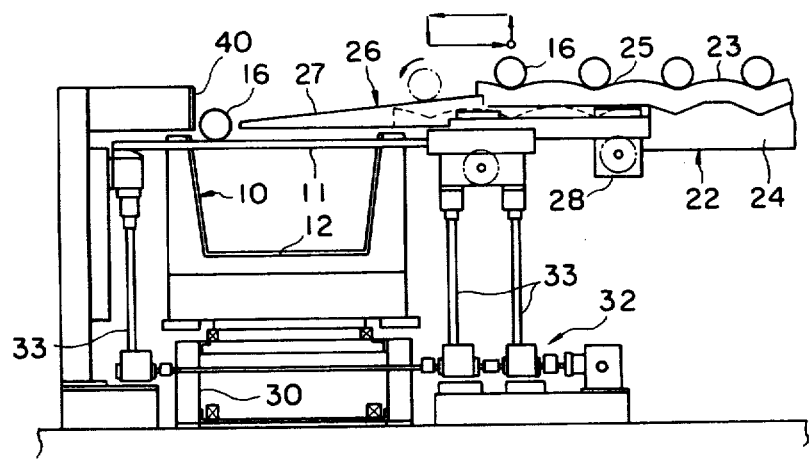
Figure 25:
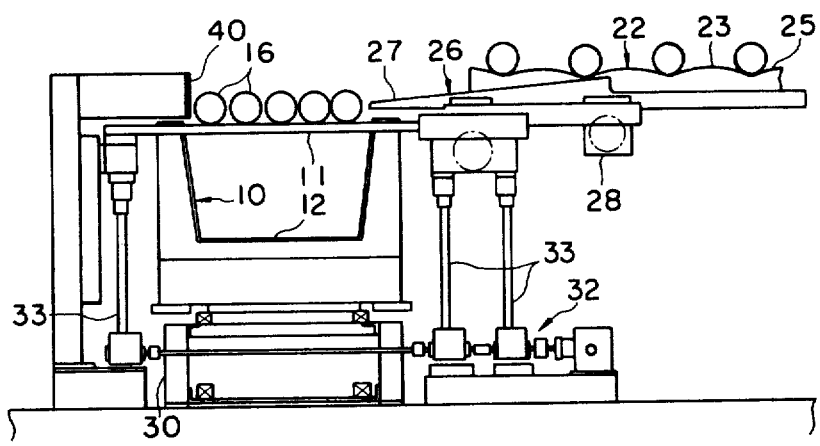
Figure 26:
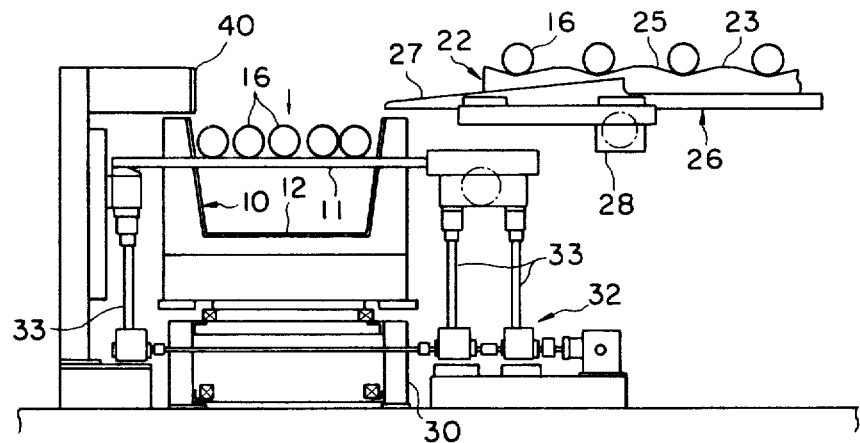
Figure 27:
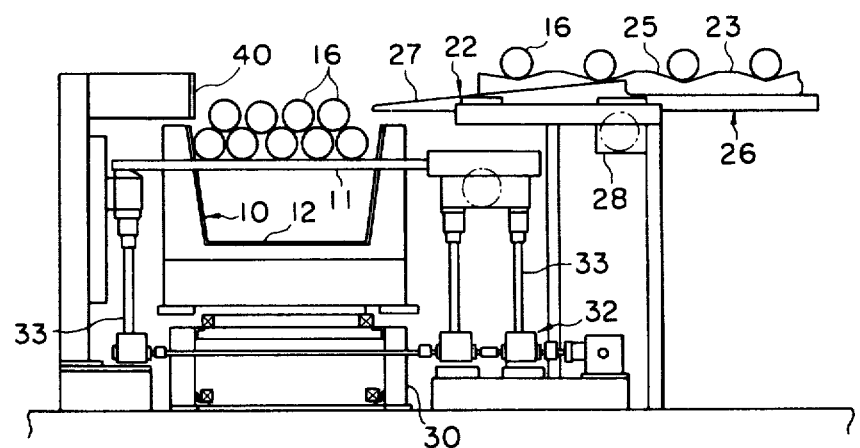

In the phases of FIGS. 24 and 25, the elongated material 16 is successively placed on support beams 11 by square motions of the movable bars 24. As soon as the elongated material 16 is transferred onto the support beams 11 in a number corresponding to the width of the receptacle channel 12, support beams 11 are lowered in a parallel fashion by operation of lift mechanism 32 as shown in FIG. 26. The cycle of operation shown in FIGS. 22 to 26 is repeated, thereby successively loading elongated material 16 onto support beams 11 as shown in FIGS. 27 and 28.

Figure 30:
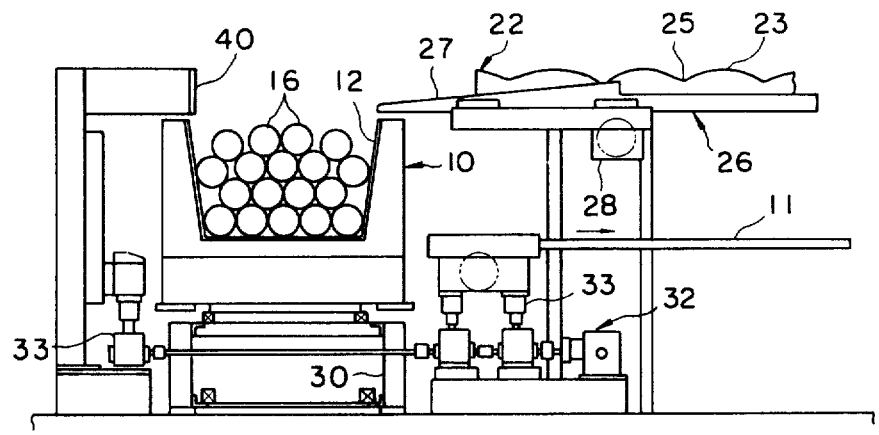
Figure 31:
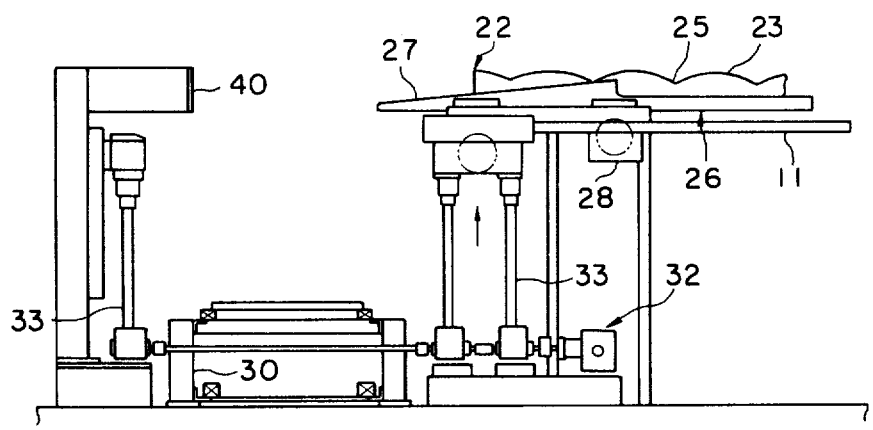

When receptacle channel 12 is filled with elongated material 16 until support beams 11 are lowered beneath the top surfaces of bottom frames 42, support beams 11 are retracted out of bed 10 as shown in FIGS. 29 and 30. Loaded bed 10 is then advanced to a predetermined position from the loading position in front of feeder 26, as shown in FIG. 31. This embodiment has an additional advantage in that a minimum necessary number of the support beams 11 are used.

According to the present invention, support beams 11 are movable up and down to permit adjustment of the dropping distance (l) of elongated material 16, so that the damage due to collision which occurs to the elongated material 16 upon loading on the cradle can be lessened to a minimum, preventing depreciation of the value of the loaded products.

Since there is no possibility of support beams 11 being jammed between the stacked loads as in the conventional apparatus, their fabrication, supply and collection can be drastically simplified, coupled with other advantages including an improvement in the loading capacity of beds 10.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for horizontally stacking elongated material of uniform shape and circular cross-section, said apparatus comprising:
   (a) a load-carrying bed having a substantially horizontal, sectionally U-shaped receptacle channel for stacking elongated material therein, said load-carrying bed comprising a plurality of pairs of upright beams positioned opposite one another along the length axis of the receptacle channel, each of said upright beams having a flange extending perpendicularly away from the length axis of the receptacle channel;
   (b) a feeder for sequentially feeding the elongated material to said load-carrying bed such that the longitudinal axis of the elongated material is substantially parallel to the length axis of the receptacle channel in said load-carrying bed;
   (c) a transfer mechanism for sequentially feeding individual units of the elongated material to said feeder at predetermined intervals;
   (d) first means for moving the distal end of said feeder by a distance which corresponds substantially to the cross-sectional width of one unit of the elongated material after each unit of the elongated material has dropped off said feeder into said load-carrying bed until a horizontal row of the elongated material has built up in said load-carrying bed;
   (e) a plurality of support beams which extend horizontally across the receptacle channel in said load-carrying bed to support the elongated material being fed to the receptacle channel at longitudinally spaced positions on opposite sides of the center of gravity of the elongated material, each of said plurality of support beams having a pair of locking members which are sized, shaped, and positioned to slide vertically along said flanges on an associated one of said plurality of pairs of upright beams, said locking members functioning to completely block movement of said support beams in the horizontal direction; and
   (f) second means for moving said support beams downwardly by a distance which corresponds substantially to the cross-sectional height of the unit of elongated material after each horizontal row of the elongated material has dropped off said feeder into said load-carrying bed.

2. An apparatus as recited in claim 1 and further comprising third means for disengaging said support beams from beneath the elongated material after the stacked elongated material has come to rest upon the bottom of the receptacle channel in said load-carrying bed.

3. An apparatus as recited in claim 1:

(a) wherein said second means comprises means for vertically movably supporting said support beams and (b) further comprising third means for disengaging said support beams from said second means after the stacked elongated material has come to rest upon the bottom of the receptacle channel in said load-carrying bed.

4. Apparatus as recited in claim 2 wherein said support beams are unburdened and extractable after the stacked elongated material has come to rest upon the bottom of the receptacle channel in said load-carrying bed.

5. An apparatus as recited in claim 1 wherein said first and second means cause stepwise rather than continuous motion of said feeder and said support beams, respectively.

* * * * *